United States Patent [19]

Schram et al.

[11] Patent Number: 4,749,757
[45] Date of Patent: Jun. 7, 1988

[54] HIGH BULK DENSITY PVC RESIN SUSPENSION POLYMERIZATION WITH INHIBITOR

[75] Inventors: Calvin K. Schram; Joseph Serratore; James R. Wallace, all of Sarnia, Canada

[73] Assignee: Exxon Chemical Patents Inc., Linden, N.J.

[21] Appl. No.: 898,964

[22] Filed: Aug. 21, 1986

[51] Int. Cl.$^4$ .................................................. C08F 2/40
[52] U.S. Cl. ........................................ 526/83; 526/84; 526/206
[58] Field of Search .................. 526/202, 82, 83, 84, 526/85

[56] References Cited

U.S. PATENT DOCUMENTS

| | | | |
|---|---|---|---|
| 3,813,373 | 5/1974 | Ito et al. | 526/88 |
| 3,929,753 | 12/1975 | Itoh et al. | 526/202 |
| 4,058,495 | 11/1975 | Serratore et al. | 526/88 |
| 4,189,552 | 2/1980 | Kuwata et al. | 526/344.2 |
| 4,360,651 | 11/1982 | Dinbergs | 526/344.2 |
| 4,458,057 | 7/1984 | Basu | 526/88 |
| 4,482,684 | 11/1984 | Gardner | 526/84 |

FOREIGN PATENT DOCUMENTS

| | | |
|---|---|---|
| 913288 | 10/1972 | Canada . |
| 76008 | 5/1982 | Japan . |
| 1416111 | 12/1975 | United Kingdom . |

*Primary Examiner*—Christopher Henderson
*Attorney, Agent, or Firm*—J. F. Hunt

[57] ABSTRACT

A suspending agent system, a polymerizable reaction mixture, and a polymerization reaction process for producing high bulk density resin on a consistent basis by incorporating in the reaction mixture prior to initiation of the reaction about 1–250 parts per million by weight of polymerization inhibitor and also including about 0.001–0.1 parts by weight based on the weight of VCM of a highly hydrolyzed PVA. Preferred PVA's have a 4 weight percent aqueous solution viscosity of 30–100 centipoise and an effective polymerization inhibitor is diethylhydroxylamine. Bulk densities may be increased from about 3–10% depending upon the size of the reaction and the particular ingredients chosen.

22 Claims, No Drawings

HIGH BULK DENSITY PVC RESIN SUSPENSION POLYMERIZATION WITH INHIBITOR

BACKGROUND OF THE INVENTION

The present invention relates in general to polymeric resins and the handling of the dry polymer product. The invention relates in particular to polyvinyl chloride (PVC) resins, their preparation, and their handling properties. The invention also relates to a polymerizable reaction mixture for producing high bulk density PVC resins and the process for their preparation.

It is highly desirable to be able to consistently prepare high bulk density homopolymer and copolymer PVC resins; i.e., resins prepared from predominantly vinyl chloride monomer (VCM). This has not been achieved in the past because of the inability to consistently polymerize the VCM reaction monomer mixture so as to produce a consistently high bulk density product having other acceptable properties. Various published procedures have not been found satisfactory for consistently producing high bulk density PVC resins with good handling and other physical properties. It is desirable that the PVC resins have good heat stability with the occurrence of few fish-eyes, good particle size distribution, good plasticizer absorption (porosity), and with a structure that easily permits essentially complete removal of the residual VCM.

In conventional PVC suspension polymerization, vinyl chloride and optionally other ethylenically unsaturated monomers are suspended in water by vigorous stirring and suspension agents. Small droplets are created and, with the help of catalysts (usually peroxide initiators), are converted to solid polymer particles during polymerization. These suspension agents are typically water-soluble protective colloids which maintain the droplets as separate entities and prevent partly polymerized monomer droplets from agglomerating together. The polymerized particles deposit as a powdery product with an apparent density, pour weight, or more typically, bulk density. The bulk density is a very important factor since a higher bulk density for the PVC product permits better space utilization for processing containers, mixers, loaders, storage silos, rail cars, processing machines such as extruders and plasticizers and other containers. The output of the processing machines is increased for higher bulk density PVC product. An especially important aspect is the improved output rate on extrusion for high bulk density suspension PVC resin.

The PVC resins of homopolymer and copolymer materials are widely used in industry for production of pipe, siding and many other products. Recently, the PVC resin products have been used in markets previously utilizing only steel, iron, and asbestos-cement materials. For vinyl siding, the PVC resins have improved cost effectiveness, impact resistance, and weatherability over conventional siding and have replaced wood and aluminum for such purposes.

Despite the recognized need for a consistently high bulk density PVC resin, there has not been produced a consistently high bulk density PVC resin having the other requisite properties to assure good processing characteristics and production of finished products of high quality. The resin must possess a relatively narrow particle size distribution as well as good porosity. Although some high bulk density PVC resins have been produced, their porosity has generally been so low and inconsistent that demonomerization (removal of residual VCM) of the resins was extremely difficult and it was impossible to consistently guarantee removal of the monomer to the extent required by governmental regulations. The skilled artisan readily recognizes that the removal of VCM is critical since it has been determined to be a liver carcinogen. In addition, high bulk density PVC resins prior to the invention have generally had a wide particle size distribution. Other processes for the production of high bulk density resin have had somewhat better results but are formed by a process so complicated as to be commercially infeasible.

The PVC resins of the invention are prepared by a suspension polymerization process and have not only a consistently high bulk density but a good balance of porosity and particle size distribution as well.

SUMMARY OF THE INVENTION

The present invention is a polymerizable VCM monomer reaction mixture for producing high bulk density PVC products as well as a polyvinyl alcohol (partially hydrolyzed polyvinyl acetate, PVA) suspension polymerization system for the process and the process for producing the resin. The suspension polymerization of the invention includes the use of a polymerization inhibitor present in the reaction mixture prior to initiation of the reaction in combination with a PVA suspension system that includes a highly hydrolyzed PVA. Production of PVC resin according to the invention provides consistently high bulk density resin with good porosity and particle size distribution properties.

DESCRIPTION OF THE PREFERRED EMBODIMENTS

A preferred embodiment of the present invention is a polymerizable reaction mixture suspension for producing high bulk density PVC resin, said suspension consisting essentially of:

(a) 1 weight part predominantly VCM monomer mixture per 1–1.5 weight parts water;
(b) 1–250 weight parts dialkylhydroxylamine per million parts by weight monomer mixture;
(c) 0.01–0.10 weight parts first PVA per hundred weight parts monomer mixture, said first PVA having a 4 weight percent aqueous solution viscosity of less than 30 centipoise;
(d) 0.01–0.10 weight parts second PVA per hundred weight parts monomer mixture, said second PVA having a weight percent aqueous solution viscosity of about 30–49 centipoise; and
(e) 0.001–0.10 weight parts third PVA per hundred weight parts monomer mixture, said third PVA having a 4 weight percent aqueous solution viscosity of 50–100 centipoise.

A preferred embodiment of the present invention is also a PVA suspension polymerization system for polymerizing a VCM reaction mixture to high bulk density PVC, said system comprising an aqueous mixture, in weight parts, of:

(a) 10,000 parts water;
(b) 0.005–2.5 parts polymerization inhibitor;
(c) 0.5–10.0 parts of a first PVA having a 4 weight percent aqueous solution viscosity of less than 30 centipoise; and
(d) 0.05–15 parts of a second PVA having a 4 weight percent aqueous solution viscosity of more than 30 centipoise.

A preferred embodiment of the present invention is also a process for consistently producing high bulk density PVC resin from aqueous suspension polymerization comprising initiating and carrying out the polymerization of a predominantly VCM monomer mixture in the presence of about 1-250 ppm by weight polymerization inhibitor, based on the weight of monomer mixture, and in the presence of a suspension agent system including about 0.001-0.10 weight parts per hundred weight parts monomer mixture of a highly hydrolyzed PVA having a 4 weight percent aqueous solution viscosity of 30-100 centipoise.

As used herein, the term "PVC" is meant to include both homopolymers of polyvinyl chloride and copolymers and terpolymers of vinyl chloride and other ethylenically unsaturated comonomers wherein the vinyl chloride is the predominant monomer. Accordingly, a predominantly VCM monomer mixture includes at least 50% vinyl chloride monomer (VCM). In one preferred embodiment, the monomer mixture consists essentially of VCM to make homopolymer PVC.

The additional ethylenically unsaturated monomers for polymerization with VCM include olefins and other monomers. Examples are vinyl acetate, vinyl formate, alkyl vinyl ethers, ethylene, propylene, butylenes, vinylidene chloride, alkyl acrylates and methacrylates, alkyl maleates, alkyl fumarates, and the like. Preferably, the predominantly VCM monomer mixtures contain about 80% or more VCM.

The resins produced according to the invention have number average molecular weights of about 20,000 to about 200,000, preferably about 50,000 to about 100,000. Their inherent viscosity ranges from about 0.4 to about 1.4, preferably in the range of about 0.5-1.0 as measured by ASTM D1243-79, Method A.

The suspension polymerizations of the present invention may be carried out on a large or small scale. The ratio of water to total monomer is usually in the area of about 0.8:1 to about 2:1, preferably about 1.05:1 to about 1.5:1. The monomer considered in this ratio is the total weight of monomers for polymerization. In the preferred case having 100% VCM and no other monomers, the ratio of water-to-monomer is preferably about 1.05:1 to about 1.4:1. We have found that the suspension polymerization of the invention is more reliably consistent on a pilot plant scale than on a laboratory scale and more reliably consistent on a large commercial scale than on a pilot plant scale.

Conventional PVC initiators are suitable for the invention. These typically contain about 8-16 carbon atoms and are soluble in the VCM. A preferred class of initiators are the peroxide initiators. A combination of initiators may be used where a temperature profile is desired. Representative examples of such initiators include, but are not limited to, lauryl peroxide, decyl peroxide, caprylyl peroxide, diisopropyl peroxydicarbonate, dicyclohexyl peroxydicarbonate, 2-ethylhexyl peroxydicarbonate, di-sec-butyl peroxydicarbonate, dibenzyl peroxydicarbonate, diisononanoyl peroxide, and several others. The diisononanoyl peroxide is a preferred initiator.

The suspension polymerization is carried out at any temperature at which the reaction may be controlled and which results in the polymerization of the monomer reaction mixture to form a high bulk density PVC resin having good properties. A workable range for the reaction is about 0°-100° C., preferably about 30°-80° C., more preferably about 50°-60° C. A preferred temperature range for initiation with the preferred initiator diisononanoyl peroxide is about 55°-60° C. Another preferred initiator is t-butylperoxyneodecanoate. Also preferred is a combination of the t-butylperoxyneodecanoate and diisononanoyl peroxide. Various combinations of the peroxides may be used. A preferred embodiment is the combination of about one part diisononanoyl peroxide with about 2-3 parts t-butylperoxyneodecanoate.

The initiators for the suspension polymerization of the invention may be used in any quantity which results in adequate preparation of high bulk density PVC resins. A suitable range for the initiators is about 0.01-0.1 parts initiator per 100 parts by weight total monomer present. A preferred range is a total of about 0.03-0.06 parts by weight initiator per 100 parts by weight total monomers.

After removing any air and oxygen in the reactor, the reaction is generally carried out at superatmospheric pressure. The gas used for pressurizing the space above the reaction mixture should not interfere with the polymerization process. Accordingly, increased pressures of up to 15 atmospheres may be used. Generally, at least about 90 psig pressure is suitable.

The reaction temperature is maintained so as to promote the activity of the peroxidic initiator, to continue polymerization at a good rate, and produce high bulk density PVC resin of the required molecular weight having good particle size distribution and good porosity for removal of VCM. The reaction is substantially complete in about four to ten hours using generally available initiators. The VCM is removed by constant vacuum over the polymer resin so as to ensure as complete a removal as possible. Typically, the resin product is heated under a vacuum above its glass transition temperature with good mixing for a period of up to about one hour. Alternatively, the resin may be steam stripped to remove residual VCM.

The PVC resins of the invention have excellent bulk densities generally above 0.5 grams/cc. Furthermore, when the suspension polymerization process of the invention is used, the bulk density of the PVC resin is generally about 3-10% higher than would be provided without the use of a polymerization inhibitor according to the invention. Thus, bulk densities of about 0.56-0.59 and higher (before shaking or other procedures) are available on a consistent basis when the process of the invention is used.

Particle size of PVC resin is typically characterized by dry sieve analysis. In this method a known quantity of resin is placed on a stack of sieves with openings of various dimensions. The sieves are shaken and the resin particles distribute themselves on the appropriate sieve. The 60-mesh fraction represents the coarse fraction while the percentage passing through 140-mesh represents the finer fraction. In the absence of a polymerization inhibitor, it was found to be very difficult on a commercial scale to keep the particle size from becoming very large. With the addition of the inhibitor in the presence of the suspending agent system described for the invention, particle size control was much improved.

Plasticizer acceptance is a measure of the weight of plasticizer which will be taken up by the resin particle. At room temperature the cold plasticizer will only penetrate the pores of the resin and not the solid polymer itself. This test serves as a good measure of the porosity of the resin. Adequate porosity is required for complete demonomerization of the resin.

According to the invention, the suspension polymerization produces high bulk density PVC resin which has the particle size distribution shifted toward a smaller median size particle. Although the resin is less consistently produced on a small scale, large scale production results in consistently good particle size, high bulk density resin. The products of the invention typically have a median particle size of less than 200 microns, usually about 150 microns. The particle size distribution is shifted so that a smaller percentage of the particles are retained on a 60 mesh screen and a higher percentage pass through a 140 mesh screen.

The particles of high bulk density PVC produced according to the process of the invention also have adequate plasticizer acceptance. This indicates a good porosity that will ensure complete removal of VCM to meet governmental regulations and eliminate the danger of contamination with a carcinogen. It also permits the incorporation of a suitable amount of plasticizer(s) for applications of the resin which require same. Resins produced without the incorporation of a polymerization inhibitor prior to the initiation of the polymerization reaction do not regularly meet the requirement for increased bulk density as with the process of the invention.

Resins produced without the incorporation of a hydrolyzed PVA in the suspension system do not consistently increase the bulk density of the resin. Production with the combination of highly hydrolyzed PVA suspension agent and polymerization inhibitor, especially dialkylamines, more especially diethylhydroxylamine, results in an increase in the bulk density of about 3% or more, often as much as 10% or more, while reducing the average particle size from about 180–200 microns to about 150 microns while maintaining an excellent porosity and plasticizer acceptance. A plasticizer acceptance level of about 19–21 parts by weight per 100 parts by weight resin is acceptable for most applications of the resin. Production of the resin without the incorporation of a sufficient amount of highly hydrolyzed PVA or of a sufficiently highly hydrolyzed PVA results in too low a bulk density. Resins produced according to the process of the invention have a plasticizer acceptance of about 20 or more parts per 100 parts resin.

The polymerization process of the invention is carried out with a suspension agent system which may be formed from a variety of materials. The suspension agent system may include celluloses, PVA's, or other suspension agents. Preferably, the suspension agent system is a PVA system. According to the invention, the suspension agent system includes about 0.001–0.1 weight parts, preferably about 0.01–0.1 weight parts, per 100 weight parts monomer mixture, of a highly hydrolyzed PVA having a 4 weight percent aqueous solution viscosity of about 30–100 centipoise. Without the presence of this highly hydrolyzed PVA, the increase in bulk density is either not achieved or not consistently obtained, although in some instances the bulk density for a polymerization may vary over a certain range. However, with the process of the invention, the bulk density of the resin is consistently raised to an improved level which results in better utilization of storage and other containers and equipment for the PVC resin.

The highly hydrolyzed PVA of the invention has a 4 weight percent aqueous solution viscosity of 30–100 centipoise, preferably 40–100 centipoise. Also preferably, the highly hydrolyzed PVA of the invention is a polyvinylacetate being predominantly hydrolyzed and having a molecular weight that represents the polymerization of more than about 2,000 monomer units. More preferably, the highly hydrolyzed PVA has more than 2,000 monomeric units in its structure and is at least about 90–100% hydrolyzed (saponified). That is, such PVA's have about 90% or more of the pendant acetate groups reacted to form a hydroxyl group, by acid or base hydrolysis, usually base hydrolysis. An alkali metal hydroxide or alkaline earth metal hydroxide is conveniently used for the hydrolysis.

According to the invention, a polymerization inhibitor is used to promote an increase in bulk density when used in combination with a PVA suspension system. Previously, celluloses had been tried for the suspension system but these alone often result in too small particle size product and are often too active in the polymerization process. Furthermore, the product often has problems in extrusion with poor fusion characteristics.

The polymerization inhibitors of the invention show no detrimental effects on the resin properties. The inhibitors are used in very small amounts and yet function very effectively for producing high bulk density resins with good properties. As mentioned above, good porosity is of great importance since a very high degree of demonomerization is required by governmental regulation. Furthermore, the process of the invention permits the recovery of high bulk density PVC resins having excellent color for subsequent applications.

Streams of VCM for polymerization and streams including both VCM and other monomers are not protected against premature polymerization since they are fairly stable and other materials tend to affect the properties of the finished resin product. According to the invention, however, a polymerization inhibitor is added in a small amount prior to initiation of the polymerization and this, when used in conjunction with a PVA in the suspension system, results in high bulk density resin having a porosity suitable for essentially complete removal of residual VCM and a good particle size distribution.

The polymerization inhibitors include a broad variety of materials which result in the production of high bulk density resin according to the invention. Included among these materials are the hydroxyl-containing compounds. These include the conventional antioxidant materials, especially hindered phenols such as BHT (butylated hydroxy toluene) and others. Another suitable class of polymerization inhibitors are the dialkyl hydroxyl amines. These include the dimethyl hydroxyl amine which may be in hydrochloride form and other dialkylhydroxylamines. The most preferred inhibitor for use in the suspension polymerization process of the invention is diethylhydroxylamine (DEHA). When used in an appropriate amount prior to initiation of the reaction mixture, the process results in high bulk density resin having excellent properties of porosity, particle size distribution. The DEHA is a mild selective reagent for the reduction of quinones to quinols but has no detrimental effects on the resin properties when used according to the invention.

Another class of acceptable polymerization inhibitors are the organic and inorganic nitrites such as sodium nitrite, potassium nitrite, lithium nitrite, esters of nitric acid such as ethyl nitrite or an amyl nitrite, and mixtures of nitrites. Of the nitrites, sodium nitrite is preferred.

The polymerization inhibitor for the suspension system of the invention is used in a small amount, generally in the range of 250 weight parts per million weight parts monomer (or monomeric mixture) in the reaction mixture. A more preferred range is about 1–50 parts per million. Still more preferred is about 5–10 parts per million on a weight basis of the total monomer. A suitable range in the suspension system then is about 0.005–2.5 parts polymerization inhibitor per 10,000 weight parts water.

The PVA suspension system is generally preferred since the use of celluloses sometimes produces a resin having a too small median particle size and of generally too active a nature which may result in problems upon extrusion including poor fusion.

In a preferred embodiment of the invention the suspension agent system also includes a first PVA having a 4 weight percent aqueous solution viscosity of less than 30 centipoise. In a more preferred embodiment the first PVA has a viscosity less than 10 centipoise and the highly hydrolyzed PVA has a viscosity of 50–100 centipoise. Still more preferably, the suspension agent system also includes an intermediate PVA having a viscosity of about 30–49 centipoise. Typically, the intermediate viscosity PVA is of lower molecular weight (and consequently lower number of monomeric units) than the highly hydrolyzed high molecular weight PVA. The intermediate PVA's have about 1,000–2,000 monomeric units and are about 70–89% hydrolyzed to produce the viscosity of 30–49 centipoise. The first PVA generally contains less than about 1,000 monomeric units, more preferably about 200–800, and is from 15–79% hydrolyzed. Any number of PVA's may be included in the suspension system so long as included therein is the highly hydrolyzed PVA having a viscosity of at least 30 centipoise.

The PVA's of the preferred suspension system are generally present in about equal amounts with a predominant amount of the highly hydrolyzed PVA being favored. Suitable ranges for the combinations of the PVA suspension system include about 0.01–0.10 parts by weight PVA of viscosity less than about 30 and a similar amount for the intermediate PVA with viscosity of about 30–49. Preferably, the first PVA has a viscosity of less than about 10. The highly hydrolyzed PVA is preferably present in an amount of about 0.001–0.10 parts by weight, more preferably about 0.01–0.10 parts by weight, per 100 parts by weight monomer mixture (or in the Case of homopolymer PVC production, VCM).

Where a highly hydrolyzed PVA of about 30–49 centipoise viscosity (usually about 75–89% or more hydrolyzed and having 1,000–2,000 or more monomeric units) is used in sufficient amount, a high bulk density resin may be produced. Preferably, a highly hydrolyzed PVA of at least about 50 centipoise up to about 100 centipoise viscosity is used in at least 0.001 parts by weight per 100 parts monomer mixture. In that case, the presence of the PVA having about 30–49 centipoise viscosity in conjunction therewith consistently results in high bulk density PVC resin. Highly preferred is the use of a high portion of highly hydrolyzed PVA wherein the PVA has a 4 weight percent aqueous solution viscosity of 50–100 centipoise. As discussed above, such PVA's usually have more than 2,000 monomeric units in their backbone structure and are about 90–100% hydrolyzed to polyvinyl alcohol.

Suspension polymerizations of PVC are generally carried out with adequate agitation and the same is similarly required for the invention. We have found that the amount of agitation may be varied according to the suspension system used, type of polymerization inhibitor present, and ratio of water-to-monomer in the system. As noted above, the presence of the polymerization inhibitor in the reaction mixture prior to initiation of the reaction is important to the invention since, when used in conjunction with a highly hydrolyzed PVA in the range of about 0.001–0.10 parts by weight, preferably about 0.01–0.10 parts by weight, per 100 parts by weight monomer mixture, the consistent production of high bulk density PVC resin having good porosity (as measured by plasticizer acceptance) is obtainable.

According to the invention, the polymerization inhibitor should be well dispersed in the reaction mixture prior to initiation of the polymerization reaction. This may be accomplished by initially agitating the mixture in the fashion known to the skilled artisan. It should also be noted that the process of the present invention, when carried out at significant scale, consistently results in the production of high bulk density resin, not previously obtainable by known processes.

The polymerization process, suspension agent system including polymerization inhibitor, and polymerization reaction mixture of the invention include advances of the art which consistently provide high bulk density PVC resin on a large scale for manufacture of products requiring a consistent resin.

The invention has met with great commercial success. Resin produced by the process of the invention has displaced resin produced by conventional suspension polymerization processes. PVC product manufacturers regularly report highly satisfactory results based on consistently high bulk density resin with good porosity. Acceptance of resin made by the inventive process continues to grow.

A better understanding of the invention may be had by a review of the above discussion taken in conjunction with the following examples which are intended for illustrative purposes and not to limit the invention.

EXAMPLES

In the following examples, the invention is illustrated by the production of homopolymer PVC.

COMPARATIVE EXAMPLE 1

On a pilot plant scale using a water-to-VCM ratio of 1.1:1, a polymerizable reaction mixture suspension was prepared by adding to the water/VCM mixture the following:

0.080 parts by weight, based on the weight of VCM, of a PVA described as having about 1700 monomeric units and being about 75–76% saponified (hydrolyzed), and having a 4 weight percent aqueous solution viscosity of about 39–47 centipoise;

0.010 parts by weight per 100 parts by weight VCM of a PVA described as having about 250 repeating monomeric units and being about 55% saponified; (PVA's having a degree of hydrolysis of less than about 60% do not form an aqueous solution for viscosity measurements);

0.030 parts by weight per 100 parts by weight VCM of a PVA having about 2200 repeating monomeric units and being about 98.5% saponified such that is has a 4 weight percent aqueous solution viscosity of about 55 centipoise;

0.035 parts by weight per 100 parts by weight VCM of the peroxide initiator t-butylperoxyneodecanoate (TBPND); and 0.015 parts by weight per 100 parts by weight VCM of the second peroxide initiator diisononanoylperoxide (DINP).

The reaction mixture was agitated thoroughly in pilot plant equipment and the reaction vessel was evacuated to about 100 millimeters mercury. Thereafter, the reaction temperature mixture was raised to about 57° C. and about 125 psig and maintained at that temperature and pressure for about six hours as polymerization proceeded rapidly. Cooling the reaction vessel was necessary to remove the heat of polymerization. After about 78% polymerization, the reactor pressure decreased. One hour later the unreacted VCM was vented and BHT was added to kill the polymerization. The reactor was then heated to 80° C. and purged with $N_2$ to remove residual VCM.

The PVC resin was recovered by standard procedures known to the skilled artisan so as to remove not only the residual monomer but substantially all of the water content of the polymerization mixture. Methods for removal include various methods using heat and vacuum in a fashion that does not interfere with the properties of the resin. The properties of the PVC resin from this comparative example are set forth in Table 1 for comparison especially to Example 2.

EXAMPLE 2

Using the same equipment and procedure as set forth in Comparative Example 1, the polymerization reaction was again carried out but this time using one additional ingredient. Prior to initiation of the polymerization, there was added to the reaction mixture 5 parts per million based on the weight of the VCM of diethylhydroxylamine. The reaction procedure was carried out in the same fashion after the polymerization was continued for about 6.5 hours. The properties of the PVC resin product of this Example 2 are set forth in Table 1 for comparison to Comparative Example 1. As can be seen from the Table, the median particle size is shifted somewhat by the addition of diethylhydroxylamine in Example 2 and the bulk density was increased by about 4.5%, a not insignificant amount in terms of efficiency of storage, transfer, and handling of the bulk resin.

COMPARATIVE EXAMPLE 3

A large scale reaction was carried out in the same fashion as the pilot plant scale reaction of Comparative Example 1 and Example 2. Using substantially the same procedure, a water-to-VCM ratio of 1.09:1 was used and the following ingredients were suppled to the reactor containing the water/VCM mixture:

0.034 parts by weight per 100 parts by weight VCM of the PVA described as having 1700 monomeric units and 75-76% saponification (measured at 39-47 centipoise);

0.010 parts by weight per 100 parts by weight VCM of a PVA described as having about 800 monomeric units and about 78.5% saponified (6.5 centipoise);

0.034 parts by weight per 100 parts by weight VCM of a highly hydrolyzed PVA described as having about 2200 monomeric units and a saponification degree of 98.5% (50-58 centipoise);

0.030 parts by weight per 100 parts by weight VCM of the peroxide initiator TBPND; and 0.012 parts by weight per 100 parts by weight VCM of the peroxide initiator DINP.

The reaction procedure was carried out in the same fashion as Example 2 with a polymerization time for the reaction of 6.5 hours. Removal of residual VCM was accomplished by continuous steam stripping on a column. The properties of the PVC resin are set forth in Table 1.

EXAMPLE 4

The same procedure was carried out on a large scale as in Comparative Example 3 using the same equipment and ingredients except that in addition thereto was added 5 parts per million based on the weight of VCM of diethylhydroxylamine, injected prior to initiation of the reaction. The same procedure was followed except that the polymerization was carried out for about 7.5 hours. The properties of the PVC resin are reflected in Table 1 for comparison with Comparative Example 3 which was carried out on the same scale. As can be seen, the PVC resin bulk density was increased by 9.4% due to the addition of the highly preferred polymerization inhibitor ingredient diethylhydroxylamine.

COMPARATIVE EXAMPLE 5

This and the following Example were carried out on a very large scale compared to the preceding two reactions, approximately 3 times as large as the previous large scale polymerizations. Using larger equipment but the same procedure, a water-to-VCM ratio mixture of about 1.10:1 was prepared and the following ingredients were added to the reactor along with this mixture:

0.025 parts by weight per 100 parts VCM of the 1700 monomeric unit PVA being about 75-76% saponified (39-47 centipoise);

0.015 parts by weight per 100 parts VCM of the 800 unit PVA being about 78.5% saponified (6.5 centipoise);

0.034 parts by weight per 100 parts VCM of the highly hydrolyzed PVA having about 2200 monomeric units and being about 98.5% saponified (50-58 centipoise);

0.030 parts by weight per 100 parts VCM of the peroxide initiator TBPND; and 0.012 parts by weight per 100 parts VCM DINP.

With a pressure of 125 psig and a reaction temperature of 57° C., the polymerization was carried out for 6.5 hours to produce the bulk resin having the properties reported in Table 1.

EXAMPLE 6

Using the same procedure and equipment and ratio of materials as in Comparative Example 5, the reaction was again carried out on a very large scale but with the addition of 5 parts per million based on the weight of VCM of the polymerization inhibitor diethylhydroxylamine. The properties of the PVC resin produced are reported in Table 1 for comparison to Comparative Example 5. As can be seen, there was an increase in bulk density of about 7.5% and the median particle size was again reduced to a better value.

COMPRATIVE EXAMPLE 7

Using pilot plant scale equipment, a polymerization was carried out with a water-to-VCM ratio of 1.4:1 and the following ingredients were added to the reaction vessel prior to initiation of the reaction:

0.040 parts by weight per 100 parts VCM of the 1700 monomeric unit PVA having 75-76% saponification;

0.040 parts by weight per 100 parts VCM of an 800 monomeric unit PVA being about 78.5% saponified;

0.020 parts by weight per 100 parts VCM of a 250 monomeric unit PVA having about 55% saponification;

0.035 parts by weight per 100 parts VCM of the peroxide initiator TBPND;

0.015 parts by weight per 100 parts VCM of the second peroxide initiator DINP.

The polymerization was carried out in the same fashion as the previous examples with a polymerization time of 6.25 hours. The properties of the resulting PVC resin are reported in Table 1.

COMPARATIVE EXAMPLE 8

This Example is carried out with the same equipment and in the same fashion with the same materials as Comparative Example 7 but there was added to the reaction mixture 5 parts per million based on the weight of VCM of diethylhydroxylamine (added prior to initiation). The polymerization was carried out for 7 hours at 57° C. and 125 psig. As can be seen from the properties in Table 1, the bulk density of the resin at this scale was not improved. It is theorized that it is required to use either a more highly saponified PVA having a greater 4 weight percent aqueous solution viscosity, or an increased amount of the fairly highly viscous PVA having 1700 monomeric units and 75-76 percent saponification. Thus while the first added PVA ingredient for Comparative Example 8 may serve as the highly hydrolyzed PVA, it would have to be present in a somewhat increased amount in order to function so as to consistently improve the bulk density of the PVC resin product.

TABLE 1

| Example # | Bulk Density (g/cc) | % on 60 Mesh | % Through 140 | Median Size (microns) |
|---|---|---|---|---|
| C1 | 0.534 | 8.1 | 1.9 | 180 |
| 2 | 0.558 | 10.1 | 5.1 | 149 |
| C3 | 0.530 | 8.0 | 1.0 | 180 |
| 4 | 0.580 | 0.2 | 7.0 | 150 |
| C5 | 0.530 | 2.6 | — | 180 |
| 6 | 0.570 | 0.0 | — | 150 |
| C7 | 0.549 | Trace | 16.6 | 122 |
| C8 | 0.525 | Trace | 37.6 | 109 |

Additional experiments have been carried out with other polymerization inhibitors including sodium nitrite and butylated hydroxytoluene (BHT). In each case with such examples, the bulk density of the resin was improved where a sufficient amount of the polymerization inhibitor was used. In the Example using the sodium nitrite, it was necessary to have present a somewhat increased amount over that required for the diethylhydroxylamine or similar diethylhydroxylamines. For nitrites generally and for the alkali metal nitrites and for a sodium nitrite in particular it is necessary to have present about 10 or more parts per million, depending upon the amount and type of PVA suspension system.

In any case, it is always necessary to have the polymerization inhibitor present prior to initiation of the reaction. When using the hindered phenols as a polymerization inhibitor a still greater amount is needed, usually about 50 or more parts per million based on the weight of VCM monomer or total monomer. The amount of the highly hydrolyzed PVA required for an increase in bulk density from the polymerization varies depending on how highly hydrolyzed the PVA is and how long the polymeric chain is. This may be expressed in summary in terms of the 4 weight percent aqueous solution viscosity. Also, the amount of PVA and the parts per million based on the weight of VCM monomer or total monomer. The amount of the highly hydrolyzed PVA required for an increase in bulk density from the polymerization varies depending on how highly hydrolyzed the PVA is and how long the polymeric chain is. This may be expressed in summary in terms of the 4 weight percent aqueous solution viscosity. Also, the amount of PVA and the amount of polymerization inhibitor needed depends not only on the characteristics of the particular reagent chosen but also the monomer reactants. In any case, it is always required to remove residual VCM monomer.

An additional series of polymerization experiments were made on a pilot plant scale using a water-to-VCM monomer ratio of 1.4 and having the ingredients listed, given in weight parts per 100 weight parts VCM. The analysis for properties of the PVC resins produced by these examples is given in Table 2.

PVA-A—a PVA having 1700 monomeric units and being about 75-76% saponified with a 4 weight percent aqueous solution viscosity of 39-47 centipoise;

PVA-B—a PVA having about 800 monomeric units and being about 78.5% saponified;

PVA-C—a PVA having about 250 monomeric units and being about 55% saponified;

PVA-D—a highly hydrolyzed PVA having about 2200 monomeric units and being about 98.5% saponified so as to provide a 4 weight percent aqueous solution viscosity of about 50-58 centipoise;

TBPND—t-butylperoxyneodecanoate;
DINP—diisononanoylperoxide;
DEHA—diethylhydroxylamine;
Sodium Nitrite;
BHT—butylated hydroxy toluene

COMPARATIVE EXAMPLE 9

| PVA-A | 0.080 |
|---|---|
| PVA-C | 0.010 |
| PVA-D | 0.030 |
| TBPND | 0.035 |
| DINP | 0.015 |

EXAMPLE 10

| PVA-A | 0.080 |
|---|---|
| PVA-C | 0.010 |
| PVA-D | 0.030 |
| TBPND | 0.035 |
| DINP | 0.015 |
| DEHA | 5 ppm |

EXAMPLE 11

| PVA-A | 0.080 |
|---|---|
| PVA-C | 0.010 |
| PVA-D | 0.030 |
| TBPND | 0.035 |
| DINP | 0.015 |
| Sodium Nitrite | 5 ppm |

EXAMPLE 12

| PVA-A | 0.080 |
|---|---|
| PVA-C | 0.010 |
| PVA-D | 0.030 |
| TBPND | 0.035 |
| DINP | 0.015 |

| | |
|---|---|
| -continued | |
| BHT | 10 ppm |

As can be seen from Table 2 the bulk density was increased about 2% when using BHT as a polymerization inhibitor. A somewhat larger portion would probably improve the bulk density more and stabilize the particle size distribution.

COMPARATIVE EXAMPLE 13

| | |
|---|---|
| PVA-A | 0.046 |
| PVA-B | 0.024 |
| PVA-C | 0.005 |
| TBPND | 0.035 |
| DINP | 0.015 |

EXAMPLE 14

| | |
|---|---|
| PVA-A | 0.046 |
| PVA-B | 0.024 |
| PVA-C | 0.005 |
| TBPND | 0.035 |
| DINP | 0.015 |
| DEHA | 10 ppm |

COMPARATIVE EXAMPLE 15

PVA-A—0.046

After 1.5 hours of polymerization time 10 parts per million diethylhydroxylamine was added to the polymerization mixture. As can be seen from the properties reflected in Table 2, this procedure did not result in an increase in bulk density and provided a product having a higher median particle size.

COMPARATIVE EXAMPLE 16

| | |
|---|---|
| PVA-A | 0.046 |
| PVA-B | 0.024 |
| PVA-C | 0.005 |
| TBPND | 0.035 |
| DINP | 0.015 |

After 2.5 hours into the polymerization procedure, 10 parts per million of diethylhydroxylamine was added to the reaction mixture. As can be seen from the properties given in Table 2, this did not result in an increase in the bulk density of the product and provided a resin having a somewhat higher median particle size.

TABLE 2

| Example # | Bulk Density (g/cc) | % on 60 Mesh | % Through 140 | Median Size (microns) |
|---|---|---|---|---|
| C9 | 0.555 | 5.9 | 2.9 | 170 |
| 10 | 0.592 | 3.8 | 11.4 | 148 |
| 11 | 0.573 | 5.7 | 5.9 | 151 |
| 12 | 0.568 | 4.2 | 1.6 | 170 |
| C13 | 0.534 | 8.1 | 1.9 | 180 |
| 14 | 0.567 | 1.9 | 13.0 | 134 |
| C15 | 0.522 | 2.9 | 3.4 | 163 |
| C16 | 0.525 | 3.1 | 3.2 | 160 |

The above Examples are intended for illustration only and not to in any way limit the scope or spirit of the invention which is defined by the appended claims.

We claim:

1. A process for consistently producing high bulk density PVC resin from aqueous suspension polymerization comprising: initiating and carrying out the polymerization of a predominantly VCM monomer mixture in the presence of about 1–250 ppm by weight polymerization inhibitor selected from the group consisting of dialkyl hydroxyl amines, BHT, and nitrites, based on the weight of monomer mixutre, and in the presence of a suspension agent system including about 0.001–0.10 weight parts per 100 weight parts monomer mixture of a highly hydrolyzed PVA having a 4 weight percent aqueous solution viscosity of 30–100 centipoise; and recovering PVC resin having a bulk density at least about 3 percent higher than that formed by the process without said polymerization inhibitor.

2. The process of claim 1 wherein said PVA has 70–100% degree of hydrolysis.

3. The process of claim 2 wherein said PVA has 1000–3000 monomer units.

4. The process of claim 1 wherein said PVA has about 2000–2500 monomer units and 90–100 degrees of hydrolysis.

5. The process of claim 1 wherein said monomer mixture consists essentially of VCM.

6. The process of claim 1 wherein said polymerization is carried out with a water:monomer ratio of about 0.8:1–1.5:1.

7. The proess of claim 1 further comprising removing residual VCM from said resin by vacuum heating or steam stripping above the glass transition temperature of the PVC resin.

8. The process of claim 1 wherein the recovered resin has a median particle size of about 150 microns.

9. The process of claim 1 wherein said polymerization is carried out in the presence of at least one peroxide initiator at about 0°–100° C.

10. The process of claim 1 wherein said compound is a dialkyl hydroxylamine.

11. The process of claim 10 wherein said amine is diethyl hydroxylamine.

12. The process of claim 1 wherein said suspension agent system also includes a first PVA having a 4 weight percent aqueous solution viscosity of less than 30 centipoise.

13. The process of claim 1 carried out with about 1–50 ppm polymerization inhibitor.

14. The process of claim 1 wherein said polymerization inhibitor is a nitrite.

15. The process of claim 14 wherein said nitrite is sodium nitrite.

16. The process of claim 11 with about 2–10 ppm of said diethyl hydroxylamine.

17. The process of claim 13 wherein said polymerization is carried out with a peroxide initiator.

18. The process of claim 12 wherein said first PVA has a viscosity less than 10 centipoise and said highly hydrolyzed PVA has a viscosity of 50–100 centipoise, and said suspension agent system further includes a second PVA having a viscosity of 30–49 centipoise.

19. The process of claim 12 wherein said suspension agent system comprises, per 100 weight parts monomer:
   (a) about 0–0.02 parts by weight of said first PVA having about 15–60% degree of hydrolysis and less than 800 monomeric units;
   (b) about 0.01–0.04 parts by weight of a second PVA having about 60–79% degree of hydrolysis and a 4 weight percent aqueous solution viscosity of less than 10 centipoise;

(c) about 0.02–0.1 parts by weight of a third PVA having about 70–89% degree of hydrolysis and a 4 weight percent aqueous solution viscosity of about 40–49 centipoise, and wherein said highly hydrolyzed PVA has a 4 weight percent aqueous solution viscosity of 50–100 centipoise.

20. The process of claim 9 carried out at about 50°–60° C.

21. The process of claim 9 wherein polymerization is initiated with a mixture of t-butylperoxyneodecanoate and diisonanoylperoxide.

22. The process of claim 9 wherein said peroxide initiators are present in the amount of about 0.01–0.1 parts by weight per hundred parts by weight monomer mixture.

* * * * *